United States Patent [19]

Foladare et al.

[11] Patent Number: 5,664,003

[45] Date of Patent: Sep. 2, 1997

[54] PERSONAL MOBILE COMMUNICATION SYSTEM WITH TWO POINTS OF ENTRY

[75] Inventors: Mark Jeffrey Foladare, Kendall Park; Shelley B. Goldman, East Brunswick; David Phillip Silverman, Somerville; Roy Philip Weber, Bridgewater, all of N.J.

[73] Assignee: AT & T, Middletown, N.J.

[21] Appl. No.: 590,237

[22] Filed: Jan. 23, 1996

[51] Int. Cl.[6] .................................................. H04Q 7/24
[52] U.S. Cl. ...................................... 455/459; 379/207
[58] Field of Search .............................. 379/56, 57, 201, 379/202, 203, 204, 207, 210, 211, 212, 214, 217; 340/311.1, 825.44

[56] References Cited

U.S. PATENT DOCUMENTS 5,311,570  5/1994  Grimes et al. ........................ 379/57
5,414,750  5/1995  Bhagat et al. ........................ 379/57
5,432,845  7/1995  Burd et al. .......................... 379/210

Primary Examiner—Dwayne Bost
Assistant Examiner—William G. Trost
Attorney, Agent, or Firm—Stephen M. Gurey

[57] ABSTRACT

In a personal reach telephone service in which a calling party's telephone call to a personal reach telephone number of a called party is bridged to a return call placed by the called party in response to a page, a connection is established between bridging and signaling equipment associated with the interexchange network, to which the calling party's call is directed, and the home PBX associated with the called party. The called party, in responding to the page, and if local to the PBX, calls into his home PBX where this return call and the calling party's call are bridged together.

9 Claims, 2 Drawing Sheets

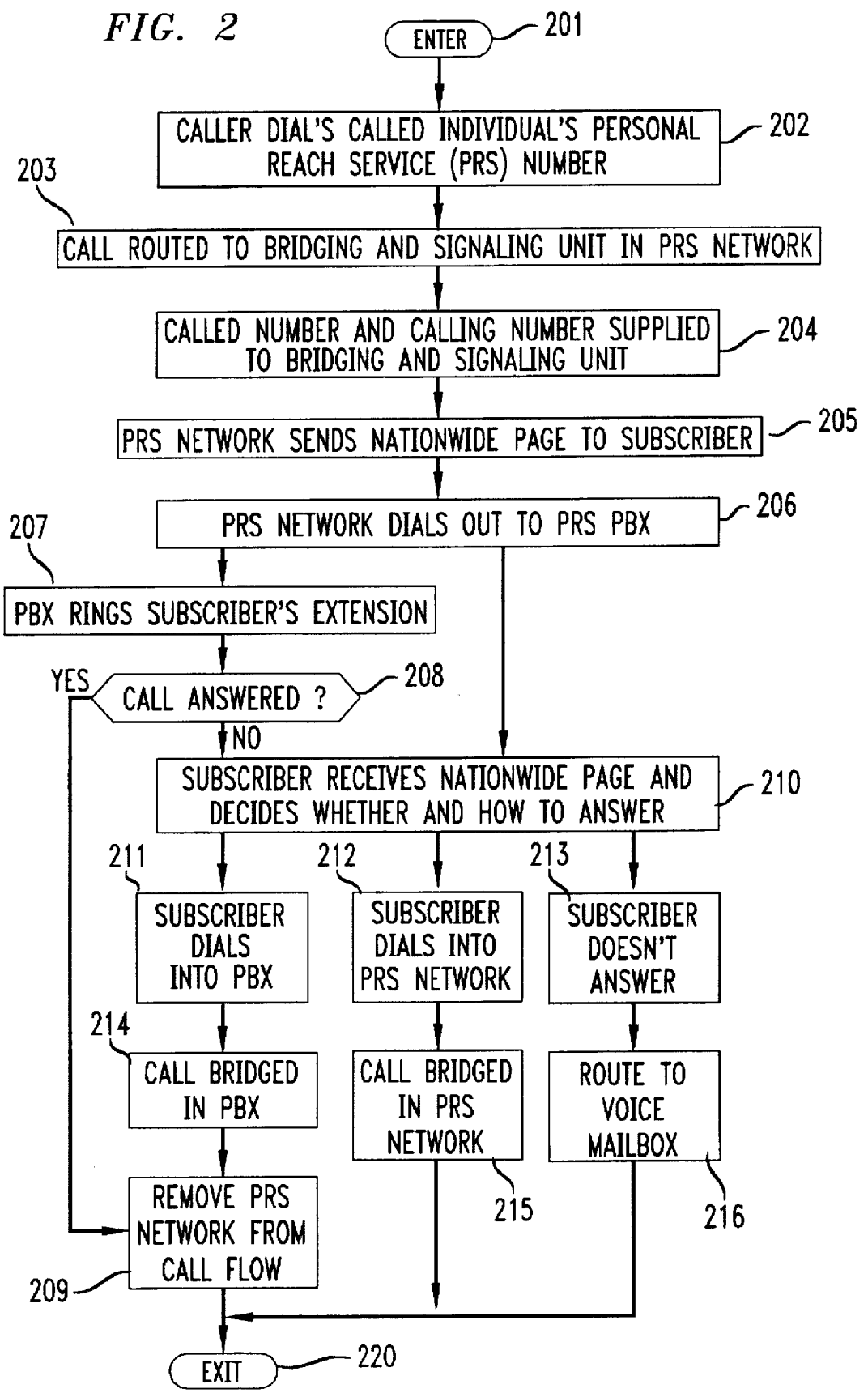

PERSONAL MOBILE COMMUNICATION SYSTEM WITH TWO POINTS OF ENTRY

TECHNICAL FIELD

This invention relates to personal communications and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. In copending applications Ser. Nos. 08/316,613 and 08/497,060 systems are described in which a page to a subscriber is initiated in response to a telephone call from a caller to a subscriber's special personal reach telephone number, and the subscriber in response to the page places a telephone call, namely a "return telephone call" to a meet-me bridge of a bridging and signaling unit at which the caller's telephone call is held for connection to the return telephone call. Upon receipt of the return telephone call at the bridging and signaling unit, the caller's telephone call and the return telephone call are bridged, i.e., connected together at the meet-me bridge holding the caller's call, so that the caller and the called party may communicate.

SUMMARY OF THE INVENTION

The cost for such a personal telephone call is high, because two telephone calls and a page must be paid for. This is especially true if, as is presently envisioned, the called party, who receives the benefit of being constantly reachable, bears the responsibility for the cost of both calls and the page. Furthermore, considerable use of the network as well as use of the bridging resources is made to maintain the connection. This is a particularly wasteful use of the network and the bridging resources when the subscriber may be frequently at or near his or her office or within an office or campus environment served by his or her local PBX.

In accordance with the present invention, at the time that a page is launched to signal the subscriber that a call is waiting, a second call is also launched by the bridging and signaling unit to the subscriber's home PBX that itself has bridging capabilities. The subscriber then, in response to the page, and if within the office or campus environment covered by his home PBX, can dial into his home PBX from any station set connected to the PBX, where the call is then bridged. Further, if the subscriber is in the general local vicinity of the home PBX, even if beyond the office or campus area covered by the PBX, the subscriber can dial into that PBX over the local exchange network, and this return call to the PBX will also be bridged in the PBX with the waiting call. Once bridging is effected in the subscriber's home PBX, the bridging and signaling unit and associated toll switch within the network are dropped from the call using transfer connect capabilities of the network. Thus, the now bridged originating call and the return call can proceed without the wasteful use of the network bridging and signaling unit and associated toll equipment. Furthermore, the cost to the subscriber may be less for the total call since less network resources are needed to maintain the bridged connection. If the subscriber is out of the office or campus environment and places the return call to the bridging and signaling unit within the network as he would normally do for a "meet-me" connection, the additional connection established between the bridging and signaling unit to the subscriber's home PBX can then be dropped. If, however, the subscriber fails to answer the page by a return call to either his home PBX or to the bridging and signaling unit in the network, the caller can deliver a message to the subscriber's voice mailbox in a messaging system associated with the home PBX over that additional connection that was established from the bridging and signaling unit.

BRIEF DESCRIPTION OF THE DRAWINGS

FIG. 2 shows a flowchart of an exemplary process for completing a telephone call placed to the reach number of a subscriber to a personal reach service as shown in FIG. 1.

DETAILED DESCRIPTION

Figure 1:
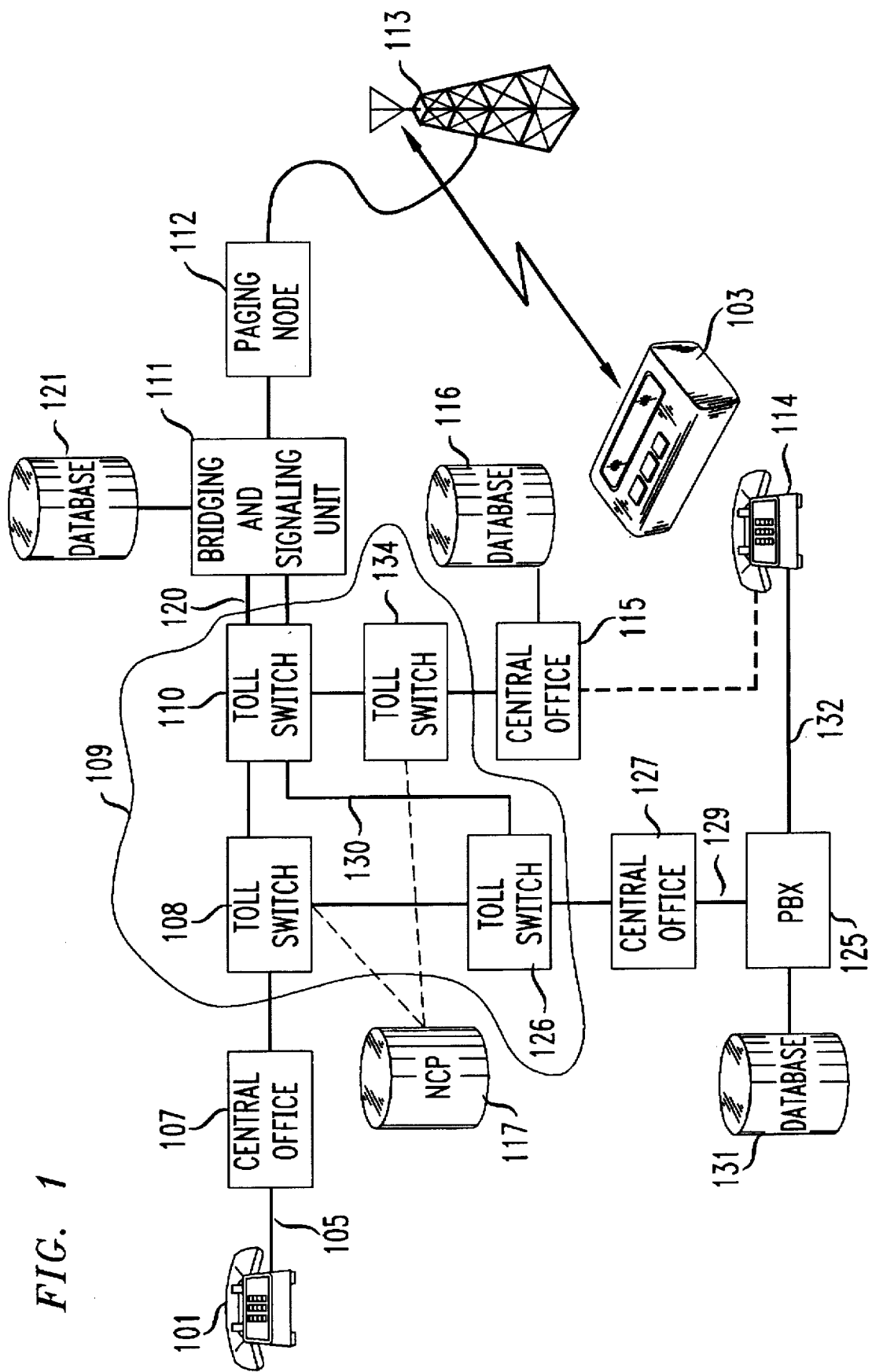
FIG. 1 shows an arrangement for providing a personal reach telecommunications services, in accordance with the present invention.

FIG. 1 shows arrangement for providing telecommunications services in accordance with the present invention. A caller places a telephone call from the calling telephone 101 to the personal reach service (PRS) telephone number of a subscriber who is also associated with a pager 103. That personal reach service telephone number, in a preferred embodiment, is an 800-type of telephone number, which is associated with the subscriber and in turn with a bridging and signaling unit 111. The caller's telephone call thus passes over telephone line 105 to central office 107 within a local exchange network. Central office 107, in turn, routes the calling party's call to toll switch 108 within an interexchange network 109. A Network Control Point (NCP) database 112 associated with toll switch 108 translates the dialed 800-type number to a conventional destination area code+ NPA+XXXX telephone number associated with the bridging and signaling unit 111 in a standard manner and switch 108 thereupon routes the call within the inter-exchange network 109 to the toll switch 110 associated with the bridging and signaling unit 111. Pager 103 is also associated with the called personal telephone, as discussed further below.

Bridging and signaling unit 111 includes a plurality of so-called "meet-me" bridge circuits, each of which is for connecting at least two incoming telephone calls to each other. Upon receipt of the caller's telephone call, bridging and signaling unit 111 forwards paging information to paging node 112. This paging information includes a predetermined code that uniquely identifies the called subscriber's pager 103. A copy of the predetermined code is stored within pager 103. Paging node 112 initiates the broadcast of a paging signal containing the paging information from paging tower 113. Pagers and paging systems are well known in the art.

Pager 103 receives paging signals transmitted from paging tower 113. If the code contained within the paging information of a paging signal matches the predetermined code stored in pager 103, pager 103 alerts the subscriber carrying pager 103. In response to being alerted by pager 103, the subscriber places a telephone call, which is the so-called "return call" from telephone 114 to a particular predetermined telephone number. Such a return call may be automatically placed if pager 103 and telephone 114 are incorporated into a single device. As such, central office 115 receives the return telephone call over line 133, shown as a dotted line in FIG. 1, and routes it to bridging and signaling unit 111 for connection to the caller's telephone call. To this end, central office 115 routes the return call to toll switch 134, which is part of inter-exchange network 109.

The telephone number of the return telephone call is translatable, i.e., a database lookup is performed to determine the routing telephone number to which the call is actually completed. For example, the return telephone call is placed to an 800-type of telephone number. Thus, NCP database 117 translates the dialed 800-type of telephone number into a destination number to route the return call to the bridging and signaling unit 111. An advantage of using an 800-type of telephone number for the return call is that the subscriber holding pager 103 can place the return telephone call without needing to have any information about the area code of the telephone line being used. A database 116, associated with central office 115, provides routing information of the return call to the proper inter-exchange carrier.

The subscriber's return telephone call routed to bridging and signaling unit 111 is bridged with the call placed by the caller from telephone 101 by a "meet-me" type of bridge (not shown) within unit 111. Bridging of the return call of the subscriber to the originating call of the caller is effected by associating the telephone number dialed by the caller from telephone 101 with the telephone number dialed by the subscriber in placing the return telephone call from telephone 114. Specifically, the personal reach telephone number dialed by the calling party is forwarded by the inter-exchange network over a signaling channel on a trunk 120 to bridging and signaling unit 111. Alternatively, the telephone number dialed by the caller from telephone 101 may be obtained by bridging and signaling unit 111 using in-band or out-of-band signaling. Database 121, connected to bridging and signaling unit 111, includes a record that associates a subscriber's called number with a return telephone number. By properly associating the telephone number dialed by the subscriber in the return call from telephone 114, which number is also provided over signaling channel 120, with the number dialed by the caller from telephone 101 as per the record in database 121, bridging and signaling unit 111 effects the bridging together of the caller's call and the subscriber's return call.

A significant improvement in the use of network facilities can be achieved through the use of the present invention. Specifically, when the subscriber is within the campus or office environment of the PBX through which he normally telephonically communicates, bridging between the originating telephone call and the return call is effected within that PBX, as configured with bridging capabilities, rather than in the bridging and signaling unit 111 associated with the inter-exchange network 109.

At the time that bridging and signaling unit 111 sends a signal to paging node 112 to launch a page to the subscriber in response to the personal reach call to the subscriber from the caller at telephone 101, a second connection is established between unit 111 and the subscriber's home PBX 125. In order to establish such a connection, each record in database 121, in addition to providing the relationship between each subscriber's personal reach telephone number used by callers attempting to reach the subscriber and the telephone number dialed by the subscriber for the return call, optionally also provides the telephone number associated with the subscriber's home PBX 125. Thus, in response to a personal reach telephone call to a subscriber's personal reach telephone number, this second connection may be established from bridging and signaling unit 111 back through toll switch 110 over trunk 130 to the toll switch 126 in the inter-exchange network 109 to which the central office 127 associated with PBX 125 is connected. This second connection is completed through central office 127 to PBX 125 which, as noted, is adapted to include the "meet-me" type of bridging equipment for bridging two telephone calls together. In order to effect bridging, the signaling information, i.e., the personal reach telephone number dialed by the caller from telephone 101, is passed through the inter-exchange network 109 to toll switch 126, and from there over a signaling channel of trunk 128 to central office 127, and thence over a signaling channel of trunk 129 to PBX 125. As previously noted, signaling information may be alternatively provided in-band or out-of-band. Database 131 is associated with PBX 125. Database 131 stores a record for each personal reach service subscriber for which PBX 125 is a home PBX. Each record contains the PRS telephone number to which a caller dials to reach the subscriber and a telephone number or extension on PBX 125 associated with the subscriber which the subscriber dials in response to a page. Alternatively, if a different number is not used on PBX 125 for each subscriber, the record contains an ID sequence that the subscriber must enter through a touchtone pad when placing the return call to PBX 125 in response to the page. PBX 125 thus associates the incoming call with the return call through the number dialed by the caller and either the number dialed or the ID entered by the subscriber. In addition, each record contains the subscriber's local extension on PBX 125 to which an attempt to locate the subscriber can be made simultaneously with the page and to which the caller can leave a voice-mail message if the subscriber neither answers the page with a return call or picks up his local extension.

In accordance with the present invention, the subscriber upon receiving a page and if within the campus or office environment associated with his home PBX 125 may respond to page by placing the return call directly into PBX 125 from telephone 114 over connection 132, for bridging to the call from telephone 101. Upon such occurrence, using transfer connect capabilities of the switched inter-exchange network as disclosed in U.S. Pat. No. 5,432,845 issued on Jul. 11, 1995 to M. A. Burd et al., entitled "Post Answer Telephone Call Redirection or Rerouting", and incorporated herein by reference, a connection 135 is established directly between toll switch 108 and toll switch 126. The network bridging and signaling facilities, including unit 111 are thereupon dropped from the connection, thereby freeing a meet-me bridging circuit with bridging and signaling unit 111 to handle another call. Furthermore, since the subscriber's return call did not use the inter-exchange facilities for bridging to the caller, the cost of the call to the subscriber will be less than had the subscriber accessed the personal reach service through the normal return route to bridging and signaling unit 111.

The subscriber placing the return call, as described above, has been assumed to be within the office of campus environment served by his home PBX. The subscriber, upon receiving a nationwide page on pager 103 and if within the local calling region of PBX 125, could also enter the system by dialing a local number directly through his local exchange central office to reach PBX 125.

FIG. 2 shows a flow chart of an exemplary process for completing a telephone call placed to the personal reach service telephone number of a subscriber associated with pager 103, in accordance with the principles of the present invention. The process begins at step 201 when a caller decides to make a call to the subscriber associated with pager 103 using the subscriber's personal reach number. At step 202, the caller dials the subscriber's personal reach number at telephone 101. At step 203, the call is routed through the telecommunications carrier to the bridging and signaling unit 111. This is achieved by programming the NCP data base 117 to route all calls to personal reach telephone numbers to the bridging and signaling unit 111 that handles such calls.

At step 204, the called number is supplied to the bridging and signaling unit 111 and, for that called number, from the record for the called number in data base 121, the code of pager 103 for alerting the subscriber and the telephone number to which a return call is placed are retrieved. At step 205, the PRS network sends a nationwide page to the subscriber's pager 103 using the identified code of the pager. At this same time, at step 206, the PRS network dials out to the PRS PBX 125 associated with the identified subscriber to establish a second connection.

In step 207, in response to the call to the subscriber's PBX 125, the PBX rings the subscriber's local extension. If, at decision step 208, the call is answered by the subscriber on his local extension, the PRS network, at step 209, is removed from the call flow and a direct connection is established between the caller at telephone 101 and the subscriber on his local PBX extension. The call establishment process then ends at exit step 220. If, at decision step 208, the call is not answered by the subscriber at his local extension, the subscriber, at step 210, receives the nationwide page on pager 103.

In response to that page, depending upon where the subscriber is located when the page is received, the subscriber may: 1) at step 211, dial into PBX 125 using either a PBX extension unique to the subscriber for such personal reach calls or a PBX extension common to all personal reach subscribers together with a personal ID; 2) at step 212, dial into the PRS network through his most local central office 115 using his unique return call telephone number to establish a connection with bridging and signaling unit 111; or 3) at step 213, either intentionally or unintentionally, not respond to the page. If the subscriber dials into PBX 125, at step 214 the call is bridged in PBX 125 and, at step 209, the PRS network is removed from the call flow and, at step 220, the call establishment procedure is completed. If the subscriber dials into the PRS network, the call, at step 215, is bridged in the PRS network, and at step 220, the call establishment procedure is completed. The second connection to PBX may be optionally disconnected or left in place for a voice-mail message. If the subscriber does not respond to the page then, at step 216, the second connection established to PBX 125 is routed to the subscriber's voice-mailbox so that the caller may leave a message. The call establishment procedure then ends at step 220.

The above-described embodiment is illustrative of the principles of the present invention. Other embodiments could be devised by those skilled in the art without departing from the spirit and scope of the present invention.

The invention claimed is:

1. A method for use in completing a telephone call from a calling party that is placed to a personal telephone number of a called party, the method comprising:

receiving said calling party's call at a meet-me bridge that bridges two calls together;

determining the home PBX of the called party from the personal telephone number called by the caller;

paging the called party to alert the called party that a telephone call is waiting;

establishing a connection between the meet-me bridge and the home PBX of the called party while maintaining the calling party's call at the meet-me bridge;

if the called party is responsive to the page from a location local to the called party's home PBX, receiving a telephone call from the called party at the called party's home PBX and then connecting the calling party's call to the home PBX; and bridging together at the called party's home PBX the telephone call from the calling party and the called party's telephone call responsive to the page.

2. The method of claim 1 further comprising the steps of connecting the calling party's call directly to the called party's home PBX when the telephone call from the called party responsive to the page is received in the called party's home PBX; and disconnecting the connection between the meet-me bridge and the called party's home PBX.

3. The method of claim 1 further comprising the step of connecting the calling party's call to a voice mailbox associated with the called party's home PBX and belonging to the called party if the called party does not respond to the page.

4. The method of claim 1 further comprising the steps of receiving in the meet-me bridge a telephone call from the called party responsive to the page if when receiving the page the called party is not local to the called party's home PBX, and bridging together at the meet-me bridge the calling party's and the responsive call from the called party to the meet-me bridge.

5. The method of claim 1 further comprising the step of ringing a telephone associated with the called party and connected to the called party's home PBX after the connection is established between the meet-me bridge and the called party's home PBX.

6. In a personal reach telephone service in which a call from a calling party to a called party's personal telephone number is bridged by a meet-me bridge to a return call placed by the called party in response to a page that indicates to the called party that a call from a calling party has been placed to the personal telephone number, a meet-me bridge being located in a bridging and signaling unit to which the call from the calling party is connected, a method comprising:

determining the home PBX of the called party from the personal telephone number called by the calling party;

establishing a connection between the bridging and signaling unit and the home PBX of the called party while maintaining the telephone call from the calling party at the bridging and signaling unit;

receiving the return telephone call from the called party at the called party's home PBX and then connecting the telephone call from the calling party to the home PBX; and bridging together at the called party's home PBX the return telephone call and the telephone call from the calling party.

7. The method of claim 6 further comprising the steps of connecting the calling party's call directly to the called party's home PBX when the return call is received at the called party's home PBX; and disconnecting the connection between the bridging and signaling unit and the called party's home PBX.

8. The method of claim 6 further comprising the step of connecting the calling party's call to a voice mailbox associated with the called party's home PBX and belonging to the called party if the called party does not make a return telephone call in response to the page.

9. The method of claim 6 further comprising the step of ringing a telephone associated with the called party and connected to the called party's home PBX after the connection is established between the bridging and signaling unit and the called party's home PBX.

* * * * *